May 8, 1934.  H. T. SEELEY  1,958,250
SPEED RESPONSIVE MEANS
Filed June 1, 1931

Inventor:
Harold T. Seeley,
by Charles E. Tullar
His Attorney.

Patented May 8, 1934

1,958,250

UNITED STATES PATENT OFFICE 1,958,250

SPEED RESPONSIVE MEANS

Harold T. Seeley, Lansdowne, Pa., assignor to General Electric Company, a corporation of New York Application June 1, 1931, Serial No. 541,315

7 Claims. (Cl. 171—118)

My invention relates to speed responsive means and particularly to arrangements for effecting a desired operation in response to a predetermined sub-synchronous speed of an alternating current motor and its object is to provide an improved arrangement for accomplishing such a result.

In accordance with my invention, I provide an improved arrangement in the secondary circuit of an alternating current motor for operating when the frequency of the induced current therein is below a predetermined value. In accordance with a preferred embodiment of my invention, I accomplish the desired result by connecting a half-wave rectifier and the winding of a time relay in series in the secondary circuit. Preferably, the relay is of the well-known slow-acting type which has a copper jacketed winding so that it opens its contacts with a time delay when the relay is deenergized.

My invention will be better understood from the following description when taken in connection with the accompanying drawing and its scope will be pointed out in the appended claims.

Figure 1:
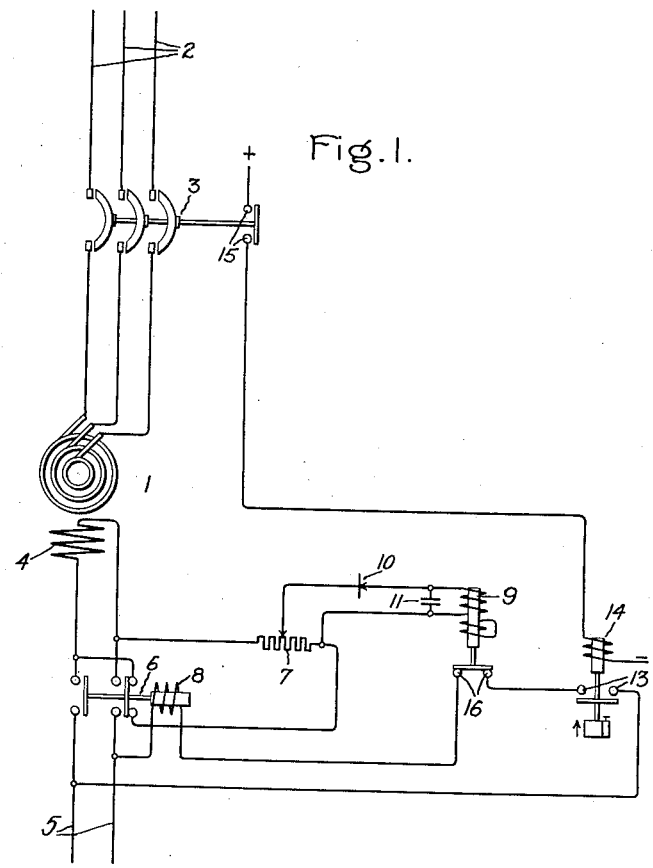
Figure 2:
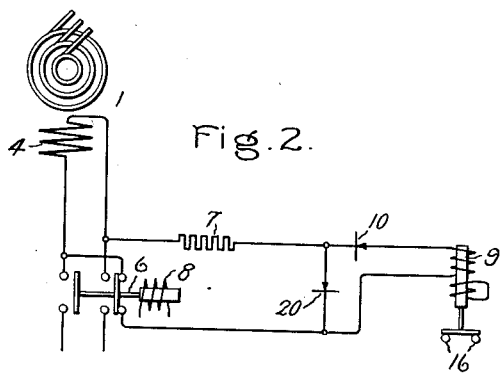

In the accompanying drawing Fig. 1 diagrammatically illustrates a synchronous motor starting system embodying my invention, and Fig. 2 illustrates a modification thereof.

Referring to Fig. 1 of the accompanying drawing, 1 represents a synchronous motor which is arranged to be connected to a suitable supply circuit 2 by means of a switch 3 which may be of any suitable type, examples of which are well-known in the art. While I have shown a manually controlled switch, it is obvious to those skilled in the art that any suitable automatic means may be employed for controlling the opening and closing thereof. The motor 1 is provided with a field winding 4 which is arranged to be connected to a suitable source of excitation 5 by means of a switch 6 which is arranged to be closed when the motor speed increases above a predetermined value. The switch 6, when open, is arranged to connect a suitable discharge resistor 7 across the terminals of the field winding 4.

In order to close the switch 6 automatically when the motor speed increases above a predetermined value, the switch 6 is provided with a closing coil 8 the circuit of which is controlled, in accordance with my invention, by means of a relay 9, the winding of which is so connected in series with a half-wave rectifier 10 that both devices are connected in series relation with the field winding 4 when the switch 6 is open. Preferably the windings of the relay 9 and the rectifier 10 are connected in series across a portion or all of the resistor 7 so that the rectifier 10 does not rectify all of the induced current flowing in the field winding 4. The relay 9 may be of any suitable type, examples of which are well-known in the art, which closes its contacts immediately after the relay winding is energized and which opens its contacts after a time delay when the relay winding is deenergized. Preferably, however, the relay is of the type having a copper jacketed winding. In order to reduce the impedance of the relay circuit so that the relay may receive sufficient induced current to open its contacts immediately after switch 3 is closed, it may be desirable to have a condenser 11 connected across the winding of the relay.

To prevent the field switch 6 from being closed when the switch 3 is open, the circuit of the closing coil 8 of the field switch 6 also includes the contacts 13 of a time relay 14 which is arranged to be energized to close its contacts 13 after the switch 3 has been closed a predetermined time. As shown in the drawing, this result is accomplished by providing the circuit of the winding of the relay 14 with contacts 15 which are arranged to be closed by the switch 3 when in its closed position.

The operation of the arrangement shown in Fig. 1 of the drawing is as follows: When the motor is at rest and the switch 3 is closed, a current of line frequency is induced in the field winding 4 and this flows through the discharge resistor 7. A portion of this current is rectified by the rectifier 10 and flows through the winding of the relay 9 so that it immediately opens its contacts 16. A predetermined time after the switch 3 is closed, the relay 14 closes its contacts 13 but in the meantime the relay 9 is operated to open its contacts 16 so that the circuit of the closing coil 8 is not completed. As the speed of the motor increases after the switch 3 is closed, the frequency of the current induced in the field winding 4 decreases, while the magnitude of the current may remain substantially constant until substantially synchronous speed is reached. Therefore, as the speed of the motor increases, the intervals of zero current in the winding of the relay 9 increase but the copper jacket prevents the relay from closing its contacts 16.

As soon as the motor reaches a predetermined subsynchronous speed, the intervals of the zero current become of such long duration that the copper jacket is unable to hold the relay in its energized position. The relay then operates to close its contacts 16 and thereby completes the circuit of the closing coil 8 of the field switch 6 across the source of excitation 5. The field switch 6 then closes to connect the field winding 4 across the source of excitation 5 and disconnects the discharge resistor 7 and the relay 9 from in series relation with the field winding 4.

It will be noted that by choosing the polarity of the rectifier 10 correctly, the arrangement may be made to apply the excitation to the motor field winding 4 during the most favorable half-cycle of slip. By using such an arrangement, there is no slipping of a pole when the motor pulls into synchronism.

In the modification of my invention illustrated in Fig. 2 I have shown the rectifier 10 and the operating winding of the relay 9 in series with the discharge resistor 7 instead of across a portion thereof. Preferably, there is connected around the rectifier 10 and the relay 9 another rectifier 20 which is arranged to rectify the half wave of the induced current which is not rectified by the rectifier 10. The operation of this modification is similar to the arrangement illustrated in Fig. 1.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, an electric circuit, a source of variable frequency voltage, means for producing in said circuit uni-directional current impulses at intervals which vary in accordance with the frequency of said voltage, a control device, and means energized by said current impulses for effecting the operation of said control device when the interval between any two successive impulses produced in said circuit by said first mentioned means exceeds a predetermined value.

2. In combination, an electric circuit, a source of variable frequency voltage, means for producing in said circuit uni-directional current impulses at intervals which vary in accordance with the frequency of said voltage, a control device, and means responsive to a predetermined duration of the interval between two successive impulses produced in said circuit by said first mentioned means for effecting the operation of said control device.

3. In combination, an alternating current circuit, an alternating current machine having a primary winding and a secondary winding, means for connecting the primary winding to said circuit, rectifying means connected to said secondary winding and arranged to allow induced current to flow through it during only a portion of each cycle of the voltage induced in said secondary winding when said motor is operating at a subsynchronous speed, a control device, and means responsive to the duration of the portion of the cycle of induced voltage during which no induced current flows through said rectifying means for effecting the operation of said control device when the duration of said portion of the induced voltage cycle exceeds a predetermined value.

4. In combination, an alternating current circuit, an alternating current machine having a primary winding and a secondary winding, means for connecting the primary winding to said circuit, rectifying means connected to said secondary winding and arranged to allow induced current to flow through it during only a portion of each cycle of the voltage induced in said secondary winding when said motor is operating at a subsynchronous speed, a control device, and means for effecting the operation of said control device when the duration of the portion of the cycle of induced voltage during which no induced current flows through said rectifying means exceeds a predetermined value including a time relay having a winding energized by the rectified induced current.

5. In combination, an alternating current source, a synchronous motor having an armature winding and a field winding, means for connecting said armature winding to said source, a control device, a half-wave rectifier connected in series relation with said field winding, and means for effecting the operation of said control device when the duration of the portion of each cycle of the induced voltage during which no current flows through said rectifier exceeds a predetermined value including a time relay having a winding connected in series relation with said rectifier and field winding.

6. In combination, an alternating current source, a synchronous motor having an armature winding and a field winding, means for connecting said armature winding to said source, a control device, a resistor connected in series relation with said field winding, a half-wave rectifier connected across a portion of said resistor, and means for effecting the operation of said control device when the duration of the half cycle of induced voltage during which no induced current flows through said rectifier exceeds a predetermined value including a time relay having a winding connected in series relation with said rectifier across said portion of said resistor.

7. In combination, an alternating current source, a synchronous motor having an armature winding and a field winding, means for connecting said armature winding to said source, a control device, a resistor connected in series relation with said field winding, a half-wave rectifier connected across a portion of said resistor, and means for effecting the operation of said control device when the duration of the half cycle of induced voltage during which no induced current flows through said rectifier exceeds a predetermined value including a time relay having a winding connected in series relation with said rectifier across said portion of said resistor, and a condenser connected in shunt around the winding of said relay.

HAROLD T. SEELEY.